UNITED STATES PATENT OFFICE.

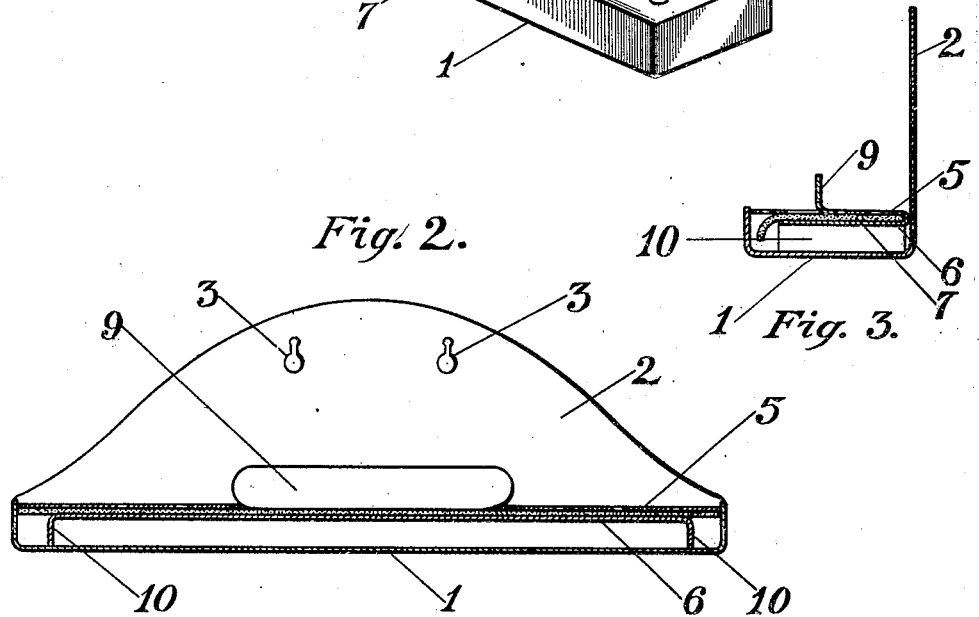

PETER B. CLAUSEN, OF NEW LISBON, WISCONSIN.

INSECT EXTERMINATOR.

1,427,723.　　　　Specification of Letters Patent.　　Patented Aug. 29, 1922.

Application filed September 14, 1921. Serial No. 500,652.

*To all whom it may concern:*

Be it known that I, PETER B. CLAUSEN, residing at New Lisbon, in the county of Juneau and State of Wisconsin, a citizen of the United States, have invented certain new and useful Improvements in Insect Exterminators, of which the following is a specification.

My invention relates to an improvement in insect exterminators.

The object is to provide a simple and effective means of poisoning flies and other insects, and it consists of a receptacle capable of being detachably supported at some convenient point, and constructed and adapted to contain a liquid poison, in connection with a removable cover which is constructed to receive an absorbent medium which is kept wet with the poison, the cover being slotted on its upper surface to expose the medium for the insects. It consists in other features of construction which will be described and pointed out in the claims.

In the accompanying drawings:

Fig. 1 is a view in perspective;

Figs. 2 and 3 are longitudinal and transverse sections.

The numeral 1 represents the receptacle which contains the liquid poison; and 2, is the back; and 3 indicates key-hole slots therein adapted to receive nails or hooks by which the exterminator is removably supported on a wall or other upright surface.

The numeral 4 represents the cover. This is preferably made of sheet-metal folded together and forming the top 5 and bottom 6, and between which is received an absorbent medium 7, such as felt, blotting-paper, or other wick-like fabric, one edge of which depends into the liquid, of course supplying the entire absorbent medium with moisture from the supply in the receptacle 1.

The top is provided with one or more elongated slots 8, through which the absorbent medium is exposed and made accessible to the insect. The portion forming the slots is bent upwardly to form a handle 9, which likewise brace the cover throughout its length. The extreme ends of the bottom are bent downwardly to form legs 10 upon which the cover rests removably in the receptacle.

In this way, I have provided a simple, efficient means for poisoning flies and other insects.

The device is simple, easily handled, can be cleaned without difficulty, and can be manufactured and sold at a reasonable cost.

And practically eliminates the danger in using poison.

I claim:

1. An insect exterminator including a receptacle, a removable cover fitted thereto, said cover having openings in the top, means therebeneath between which and the cover to receive an absorbent medium, and an absorbent medium held between the cover and said means with one edge extending downwardly into the receptacle.

2. An insect exterminator including a receptacle, a removable cover having a slotted top and one edge folded under to form a bottom, an absorbent medium held between the top and bottom with one end in the receptacle and exposed through the slot, the metal cut to form the slot bent upwardly to form a handle and strengthening rib.

3. An insect exterminator including a receptacle, a removable cover having a slotted top and one edge folded under to form a bottom, an absorbent medium held between the top and bottom with one end in the receptacle and exposed through the slot, the metal cut to form the slot bent upwardly to form a handle and strengthening rib, and the ends of the bottom bent downwardly to form legs.

4. An insect exterminator including a receptacle, a removable cover having a slotted top and one edge folded under to form a bottom, and an absorbent medium held between the top and bottom with one end in the receptacle and exposed through the slot, the metal cut to form the slot bent upwardly to form a handle and strengthening rib, the ends of the bottom bent downwardly to form legs, one side of the receptacle in the form of a bracket provided with key-hole slots as a means for suspending the exterminator on some vertical surface.

In testimony whereof I hereunto affix my signature.

PETER B. CLAUSEN.